US009594953B2

(12) United States Patent
Kaminogo et al.

(10) Patent No.: US 9,594,953 B2
(45) Date of Patent: Mar. 14, 2017

(54) APPROVAL SYSTEM AND APPROVAL METHOD

(71) Applicant: KYOCERA Document Solutions Inc., Osaka (JP)

(72) Inventors: Akira Kaminogo, Osaka (JP); Yoshihiko Arai, Osaka (JP); Masato Tanba, Osaka (JP); Yuri Moritani, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/055,584

(22) Filed: Feb. 27, 2016

(65) Prior Publication Data

US 2016/0253557 A1 Sep. 1, 2016

(30) Foreign Application Priority Data

Feb. 27, 2015 (JP) ................................. 2015-037785

(51) Int. Cl.
*G06K 9/00* (2006.01)
*H04L 29/08* (2006.01)
(Continued)

(52) U.S. Cl.
CPC ......... *G06K 9/00442* (2013.01); *G06F 21/32* (2013.01); *G06F 21/606* (2013.01); *G06K 9/00013* (2013.01); *G06K 9/00087* (2013.01); *G06K 9/00161* (2013.01); *G06K 9/00892* (2013.01); *H04L 67/06* (2013.01); *H04L 63/0861* (2013.01)

(58) Field of Classification Search
USPC .......... 382/116, 119, 124; 709/206; 715/234, 715/751
See application file for complete search history.

(56) References Cited

U.S. PATENT DOCUMENTS 5,850,219 A * 12/1998 Kumomura .......... G06Q 10/107 709/206

FOREIGN PATENT DOCUMENTS

JP 08180114 * 7/1996 ............. G06F 17/60
JP 2010-213326 A 9/2010

* cited by examiner

*Primary Examiner* — Anh Do
(74) *Attorney, Agent, or Firm* — Hawaii Patent Services; Nathaniel K. Fedde; Kenton N. Fedde

(57) ABSTRACT

To provide an approval system associated with an approval workflow that identifies a signature document. A document management server for managing document data is connected with a client terminal (CLT) via an in-house LAN. Also, a seal to be affixed to a paper containing document specification information establishes a communication to the CLT. The seal reads the document specification information and user's fingerprint information and transmits the resulting pieces of information and impression information to the CLT. The document management server receives the document specification information, the fingerprint information and the impression information to confirm a coincidence between the received fingerprint and matching fingerprint and to confirm a coincidence between a set of the received document specification information and the received impression information and a set of matching document specification information and matching impression information, and to notify an approval situation to the CLT.

4 Claims, 8 Drawing Sheets

(51) Int. Cl.
*G06F 21/60* (2013.01)
*G06F 21/32* (2013.01)
*H04L 29/06* (2006.01)

APPROVAL SYSTEM AND APPROVAL METHOD

INCORPORATION BY REFERENCE

This application is based on and claims the benefit of priority from Japanese Patent Application No. 2015-037785 filed on Feb. 27, 2015, the entire contents of which are hereby incorporated by reference.

BACKGROUND

The present disclosure relates to an approval system and an approval method both of which are suitable for approving an affixed seal or signature to a paper such as a form.

It is customary that an authorizer or a person who has approval authority affixes a seal or a signature in order to certificate the confirmation of contents of a paper such as a form or to approve the written contents. This affixing of seal or signature will allow a person who prepared the document or the like to believe that the written content of the document is certificated by the authorizer.

However, if a third person who impersonates the authorizer affixes a seal or a signature to a document such as a form, a problem may raise in reliability thereof.

To cope with such a problem, there has been proposed a seal having a typical notification function. In this seal, a fingerprint detection sensor acquires fingerprint information of a finger of a hand that grips a casing that constitutes a main body of the seal. Then, the resulting fingerprint information is matched with fingerprint information of a qualified user which is previously registered fingerprint information. Only when the result proves the qualified user, a control part controls an inkjet unit. Then, a registered impression is formed on an object matter such as a paper.

Indeed, the aforementioned seal having a typical notification function will form the registered impression on the object matter such as the paper only when the qualified user is confirmed by fingerprint matching. Thereby, the problem of illegal usage of the seal will be overcome. In this illegal usage problem, a person other than someone impersonates someone affixes a seal.

SUMMARY

An approval system according to an aspect of the present disclosure includes a document management server, a client server, and a seal. The document management system operates to manage document data. The client terminal is connected to the document management server via a communication line. The seal operates to establish a communication in a wireless manner with the client terminal and has impression information representing an impression of the seal to be stamped on a paper on which document specification information is provided. Here, the seal operating to read the document specification information and fingerprint information of a user and transmit the resulting document specification information and fingerprint information and the impression information to the client terminal. Also, the document management server operates to receive the document specification information, the fingerprint information and the impression information, confirm a coincidence between the received fingerprint and matching fingerprint, confirm a coincidence between a set of the received document specification information and the received impression information and a set of matching document specification information and matching received impression information, and notify an approval situation to the client terminal.

In addition, an approval system according to another aspect of the present disclosure includes a document management server, a client terminal, and a digital pen. The document management server operates to conduct an operation of managing document data. The client terminal is connected to the document management server via a communication line. The digital pen operates to establish a communication in a wireless manner with the client terminal and operates to affix a signature to a paper on which document specification information is provided. The digital pen operating to read the document specification information, fingerprint information of a user and handwriting of the user, and transmit, to the client terminal, the resulting document specification information, the resulting fingerprint information and handwriting information that is indicative of the resulting handwriting. The document management server operating to receive the document specification information, the fingerprint information and the handwriting information from the client terminal, confirming a coincidence between the received fingerprint information and matching fingerprint information, confirm a set the received document specification information and the received handwriting information and a set of matching received document specification information and matching received handwriting information, and notify an approval situation to the client terminal.

BRIEF DESCRIPTION OF THE DRAWIMGS

DETAILED DESCRIPTION

First Exemplary Embodiment

Figure 1:
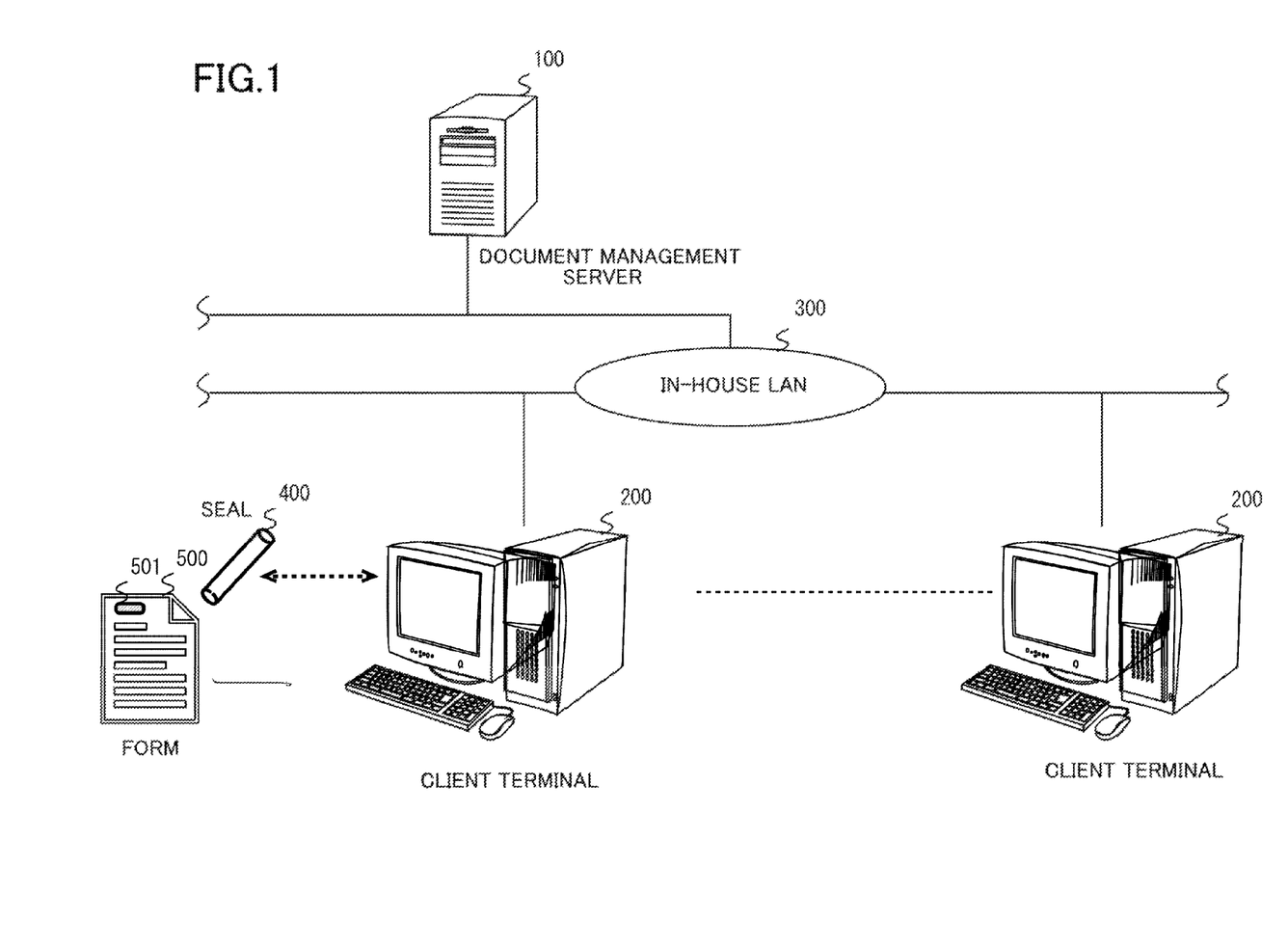
FIG. 1 illustrates an example of an approval system according to a first exemplary embodiment of the present disclosure.

Hereinbelow, with reference to FIGS. 1 to 5, a description will be made as to an approval system according to a first exemplary embodiment of the present disclosure. As illustrated in FIG. 1, the approval system includes a document management server 100, a client terminal 200, and a seal 400. The document management server 100 and the client terminal 200 are connected with each other via, for example, a communication line of an in-house LAN (Local Area Network) 300. In addition the seal 400 and the client terminal 200 are connected with each other via a short distance wireless communication in terms of electromagnetic wave or infrared. Each of the seal 400, the document management server 100, and the client terminal 200 operates as will be detailed later.

The document management server 100 manages document data of a paper 500 such as a form to which the seal 400 is affixed and on which document specification information is provided. That is to say, the document management server 100 manages the paper as to, for example, which paper 500 is sealed, by whom and when. The document management server 100 also transmits approval situation indication data for indicating an approval situation in an approval workflow to the client terminal 200. It is to be noted that a detailed description of the document management server 100 will be made later.

The client terminal 200 confirms, for example, the approval situation in the approval workflow at a side of the document management server 100. It is to be noted that a detailed description of the client terminal 200 will be made later. The seal 400 transmits fingerprint information, document specification information, and impression information representing an impression of the seal to the client terminal 200. It is also to be noted that a detailed description of the seal 400 will be made later.

Figure 2:
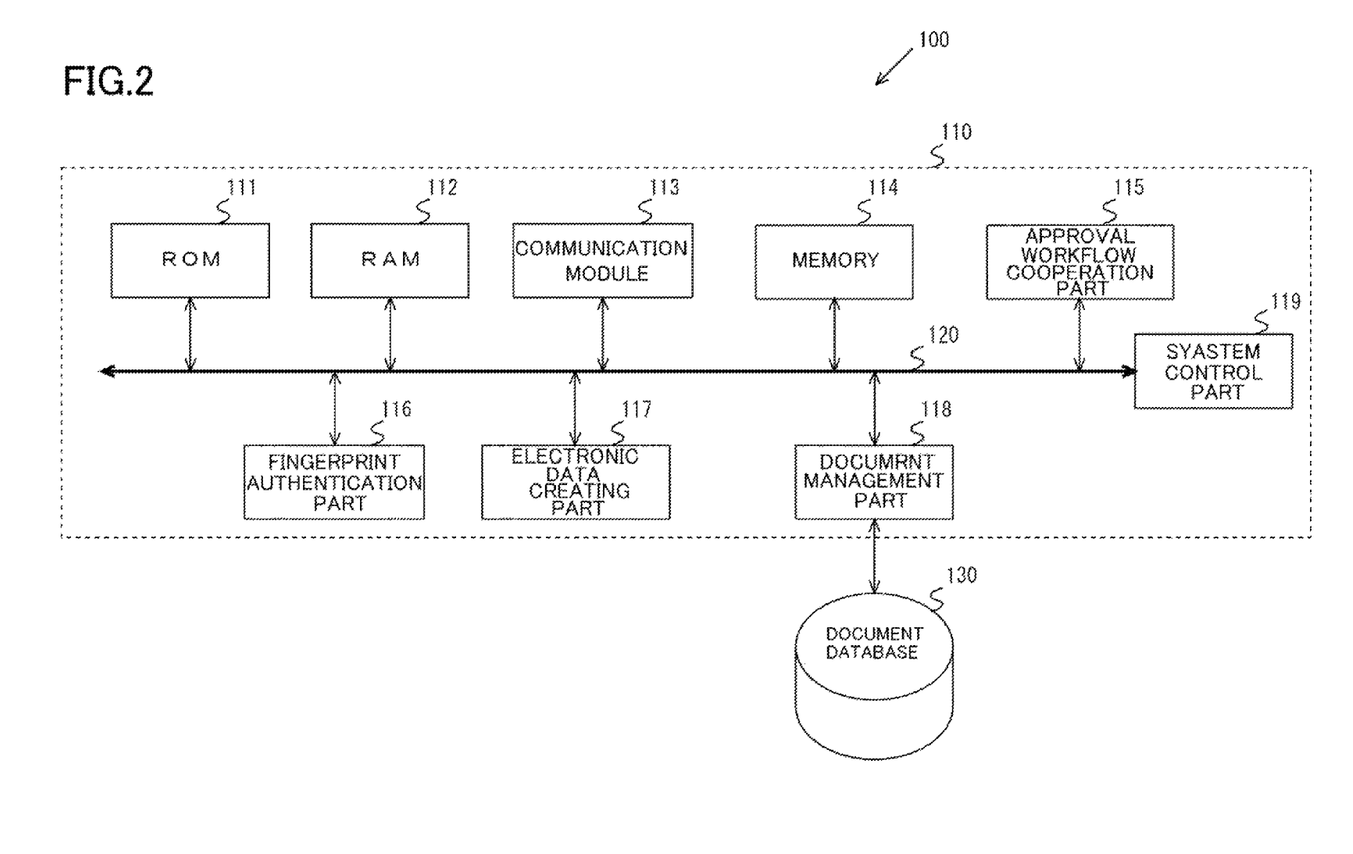
FIG. 2 illustrates a configuration of a document management server that is shown in FIG. 1.

Next, with reference to FIG. 2, an example of a configuration of the document management server 100 is described. The document management server 100 includes a control part 110 and a document database 130.

The control part 110 is provided with a ROM (Read Only memory) 111, a RAM (Random Access Memory) 112, a communication module 113, a memory 114, an approval workflow linkage part 115, a fingerprint verification part 116, an electronic data creation part 117, a document management part 118, and a system control part 119. In addition, these devices are connected to each other via a data bus 120. The communication module 113, the memory 114, the approval workflow linkage part 115, the fingerprint verification part 116, the electronic data creation part 117, the document management part 118, and the system control part 119 have a processor providing one or a plurality of circuits, such as Central Processing Unit (CPU), various programs can be read and executed, and the various programs previously embedded inside can also be executed. Here, the circuit can be the electronic parts to which a plurality of electronic devices are connected by wiring, or an electronic substrate.

The ROM 111 has a region that stores, for example, a control program for checking an operation of each part. The RAM 112 is a work memory that allows for executing a program therein. The communication module 113 establishes a communication to the client terminal 200 via the in-house LAN 300. More specifically, the communication module 113 receives fingerprint information, document specification information, and impression information from the client terminal 200 and to transmit a result of an approval situation in the approval workflow. It is to be noted that an original source of the fingerprint information, the document specification information, and the impression information is the seal 400.

The memory 114 has regions for storing therein matching fingerprint information of each person who has approval authority, the document specification information, and impression information of his/her seal. Here, there are registered the matching fingerprint information of each person who has approval authority, the document specification information, and the impression information of his/her seal. The document specification information is information for identifying the document provided on a paper 500 such as a form which is stored in an RF (Radio Frequency) tag 501 attached thereto. Here, the impression information is a digitalized format of a stamp face after being scanned by a scanner.

The approval workflow linkage part 115 transmits an approved document data in response to a request from another client terminal 200. It is to be noted that when a transmission sequence of approved document data is determined, transmissions of approved document data are performed to another client terminal 200 in such a sequence.

The fingerprint verification part 116 matches the finger print information that is received from the client terminal 200 and the registered fingerprint that is stored in the memory 114 to confirm whether or not the matching provides a coincidence result between the client terminal 200 and the registered fingerprint. The electronic data creation part 117, when confirms that the fingerprint verification part 116 proves the coincidence between fingerprint information from the client terminal 200 and the registered fingerprint, matches a set of the document specification information and the impression information that are received from the client terminal 200 and a set of registered document specific information and registered impression information both of which are stored in the memory 114. If the result of the matching indicates a coincidence between the set of the document specification information and the impression information that are received from the client terminal 200 and the set of registered document specific information and registered impression information, the electronic data creation part 117 causes the impression information that is registered in the memory 114 to reflect on document data that is associated to the document specification information that is stored in the document database 130 as will be described later.

The document management part 118 associates document data on the paper with the document specification information that is stored in the memory 114 to store in the document database 130. The paper 500 is, for example, a scanned format.

The system control part 119 mainly controls, for example, a linkage operation between the fingerprint verification part 116 and the electronic data creation part 117 and others. The document database 130 is a storage as a hard disk drive and has a region that stores the document data.

Figure 3:
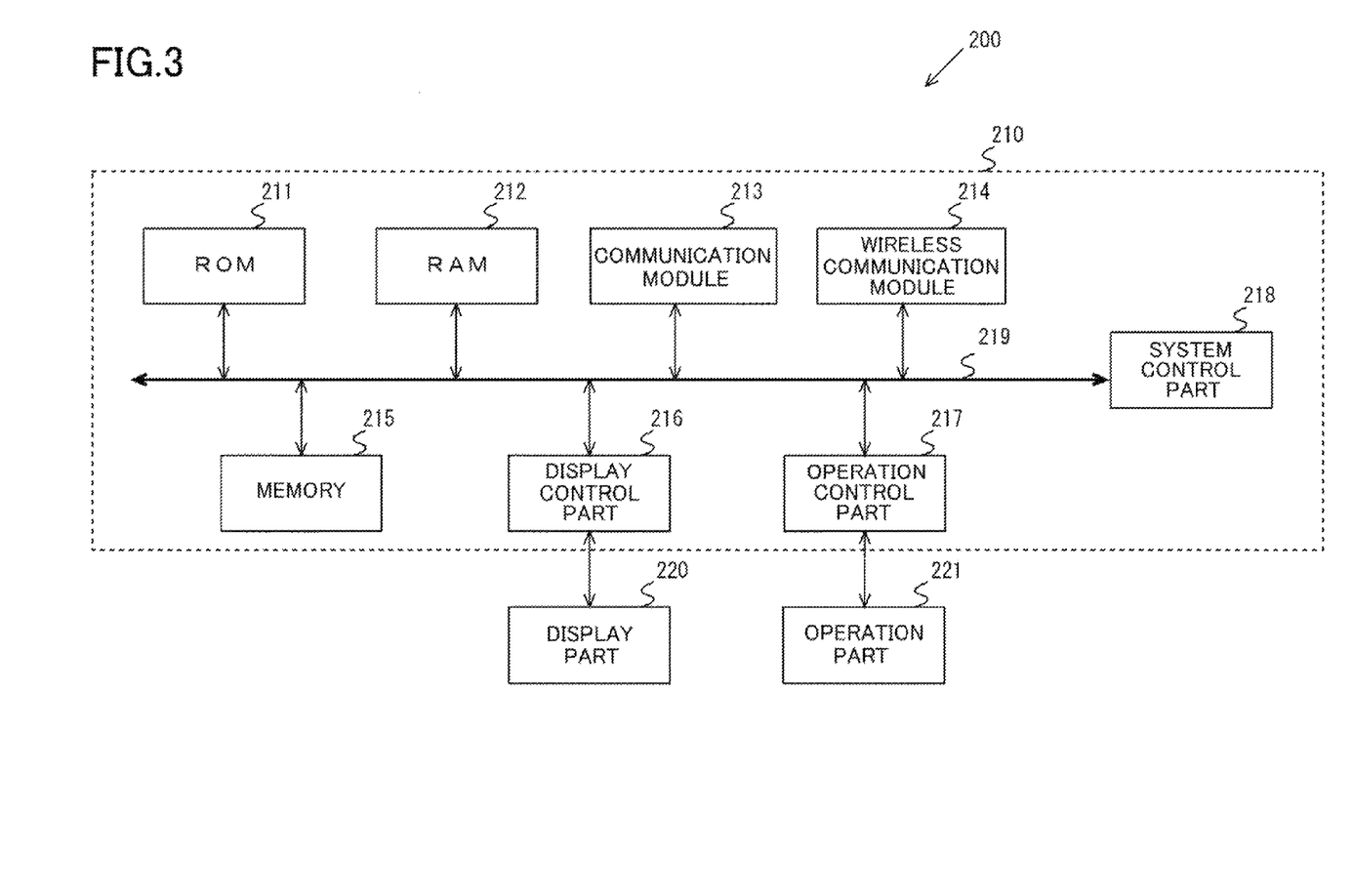
FIG. 3 illustrates a configuration of a client terminal that is shown in FIG. 1.

Next, with reference to FIG. 3, a description is made as to an example of a configuration of the client terminal 200. The client terminal 200 includes a control part 210, an indication part 220, and an operation part 221.

The control part 210 is provided with a ROM 211, a RAM 212, a communication module 213, a wireless communication module 214, a memory 215, an indication control part 216, an operation control part 217, and a system control part 218. In addition, these devices are connected to each other via a data bus 219. The communication module 213, the wireless communication module 214, the memory 215, the indication control part 216, the operation control part 217, and the system control part 218 have a processor providing one or a plurality of circuits, such as Central Processing Unit (CPU), various programs can be read and executed, and the various programs previously embedded inside can also be executed. Here, the circuit can be the electronic parts to which a plurality of electronic devices are connected by wiring, or an electronic substrate.

The ROM 211 has a region that stores, for example, a control program for checking an operation of each part. The RAM 212 is a work memory that allows for executing a program therein. The communication module 213 establishes a communication to the document management sever 100 via the in-house LAN 300. More specifically, the communication module 213 receives fingerprint information, document specification information, and impression information from the seal 400 to transmit to the document management server 100 as will be described later. The communication module 213 also receives an approval situation indication data, from the document management server 100, which is for indicating the approval situation in the approval workflow.

The wireless communication module 214 establishes a communication in a wireless manner with the seal 400. More specifically, the wireless communication module 214 establishes a communication in a wireless manner, using electromagnetic wave or infrared, with the seal 400. The wireless communication module 214 receives the fingerprint information, the document specification information, and the impression information. The memory 215 stores in a temporal manner the fingerprint information, the document specification information, and the impression information that are received from the seal 400.

The indication control part 216 controls an indication operation of the indication part 220. The operation control part 217 controls an operation of the operation part 221 that is made up of, for example, a keyboard and a mouse.

Figure 4:
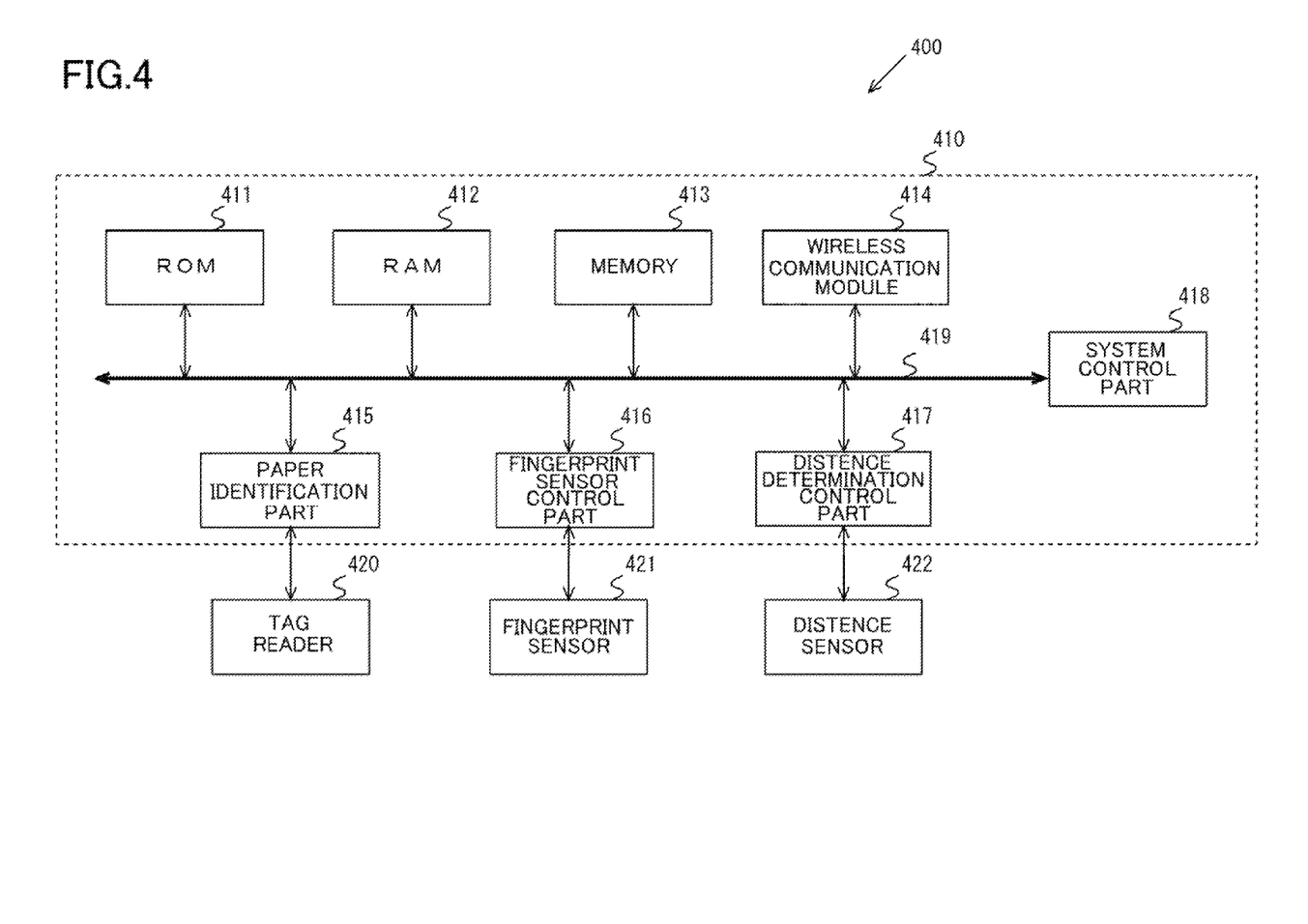
FIG. 4 illustrates a configuration of a seal that is shown in FIG. 1.

Next, with reference to FIG. 4, a description will be made as to an example of a configuration of the seal 400. The seal 400 includes a control part 410, a tag reader 420, a fingerprint sensor 421, and a distance sensor 422.

The control part 410 is provided with a ROM 411, a RAM 412, a memory 413, a wireless communication module 414, a paper identification control part 415, a fingerprint sensor control part 416, a distance determination control part 417, and a system control part 418. In addition, these devices are connected to each other via a data bus 419.

The ROM 411 has a region that stores, for example, a control program for checking an operation of each part. The RAM 412 is a work memory that allows for executing a program therein. The memory 413 stores previously the impression information and the like for the registration. The wireless communication module 414 communicates in a wireless manner to the client terminal 200.

The paper identification control part 415 controls a reading operation of the tag reader 420. Thereby, it is possible to read document specification data, via the tag reader 420, from an RF tag 501 attached to the paper 500 such as the form. It is to be noted that an IC tag is also available instead of the RF tag 501.

The fingerprint sensor control part 416 controls the fingerprint sensor 421 that reads a fingerprint. The distance determination control part 417 controls the distance sensor 422 that detects a distance to the paper 500. Employing such an arrangement will determine a completion of affixing a seal to the paper 500 when the distance between the seal and the paper 500 reaches zero.

The system control part 418 mainly controls a timing of control that is performed by each of the paper identification control part 415, the fingerprint sensor control part 416, and the distance determination control part 417.

Figure 5:
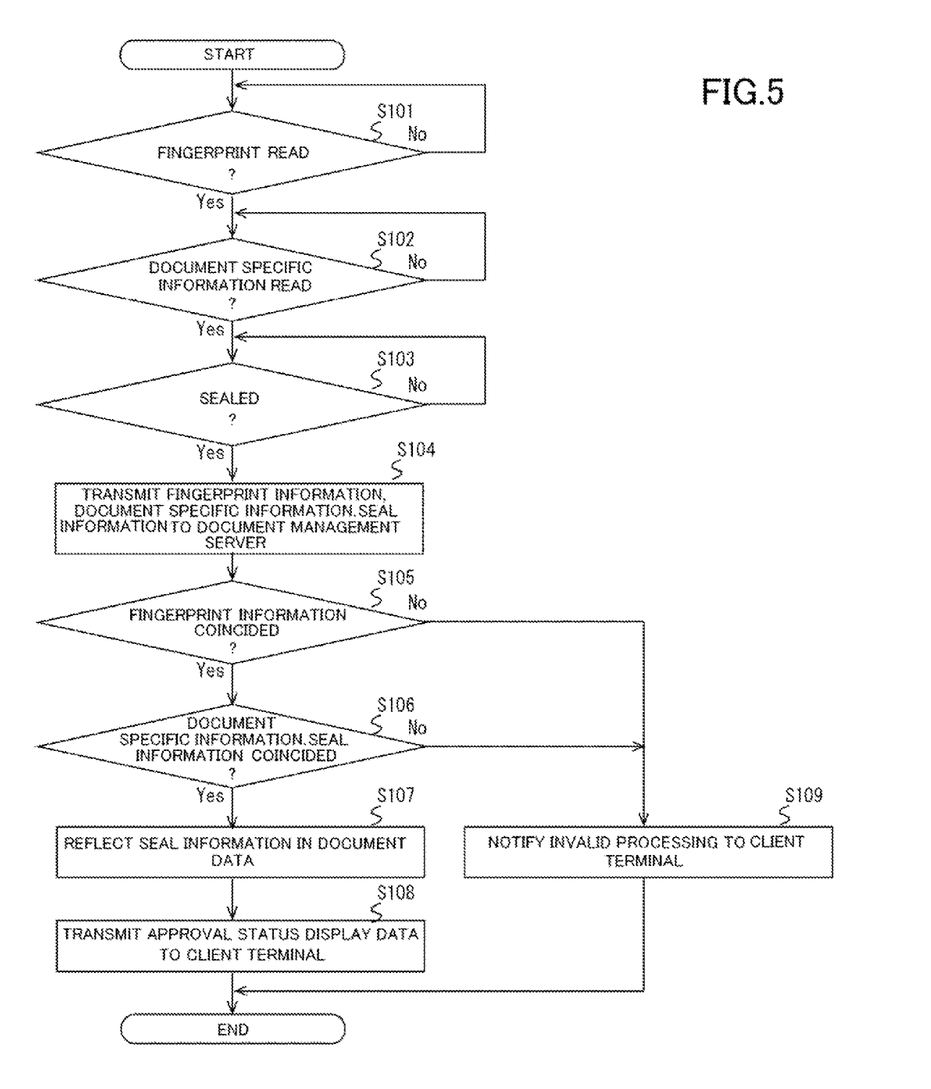
FIG. 5 illustrates approval process steps of the approval system that is shown in FIG. 1.

Next, with reference to FIG. 5, a description is made as to a process flow of the approval system that the first exemplary embodiment provides. First of all, in a case where affixing the seal 400 to the paper 500 such as the form as illustrated in FIG. 1, the system control part 418 for the seal 400 is in a waiting condition that lasts until the fingerprint sensor 421 reads a fingerprint of a person who grips the seal 400 (Step S101: No).

The system control part 418, when reading the fingerprint is conducted by the fingerprint sensor 421 (Step S101: Yes), comes to be in a waiting condition that lasts until the paper identification control part 415 reads, via the tag reader 420, the document specification information (Step S102: No).

On the other hand, the system control part 418, when the paper identification control part 415 reads, via the tag reader 420, the document specification information (Step S102: Yes), comes to be in awaiting condition that lasts until the distance determination control part 417 determines the distance between the seal 400 and the paper 500 (Step S103: No). The system control part 418, when the distance determination control part 417 determines that the distance between the seal 400 and the paper 500 comes to be zero, determines that affixing the seal 400 to the paper 500 has completed (Step S103: Yes).

It is to be noted that the wireless communication module 414 transmits, to the client terminal 200, the fingerprint information that is read by the fingerprint sensor 421, the document specification information that is read by the paper identification control part 415, and the impression information that is registered in the memory 413. At this time, the wireless communication module 214 of the client terminal 200 receives, from the seal 400, the fingerprint information, the document specification information, and the impression information. Then, the system control part 218 stores temporally, in the memory 215, the preceding fingerprint information, document specification information, and impression information.

Then, the system control part 218 of the client terminal 200 begins to control the communication module 213. Thereby, the system control part 218 of the client terminal 200 causes the communication module 213 to transmit, to the document management server 100, the fingerprint information, the document specification information, and the impression information (Step S104).

At the side of the document management server 100, the communication module 113 receives, from the client terminal 200, the fingerprint information, the document specification information, and the impression information. Then, the system control part 119 stores temporally, in the memory 114, the preceding fingerprint information, document specification information, and impression information.

Then, the system control part 119 comes to be in a waiting condition that lasts until the fingerprint verification part 116 performs a matching between the fingerprint information that is received from the client terminal 200 and the fingerprint information that is registered in the memory 114 (Step S105: No). The system control part 119, when confirms that the matching provides a coincidence result between the fingerprint information that is received from the client terminal 200 and the fingerprint information that is registered in the memory 114 (Step S105: Yes), comes to be in a waiting condition that lasts until the electronic data creation part 117 a matching between a set of the document specification information and the impression information both of which are received from the client terminal 200 and a set of the document specification information and the impression information both of which are registered in the memory 114 (Step S106: No). At this stage, for the preceding matching, the system control part 119 uses the impression information of the user whose fingerprint is found to be coincided in Step S105.

The system control part 119, when the electronic data creation part 117 confirms coincidence that the set of the document specification information and the impression information both of which are received from the client terminal 200 and the set of the document specification information and the impression information both of which are registered in the memory 114 (Step S106: Yes), causes the electronic data creation part 117 to reflect the impression information that is stored in the memory 114 on document data that is associated with the document specification information that is stored in the document database 130 (Step S107).

It is to be noted that when the matching that is performed by the electronic data creation part 117 indicates an unmatched result in either the document specification information related matching or the impression information related matching, the system control part 119 may make the approval process in the approval workflow invalid and stops the reflection of the impression information on the document data.

In addition, the system control part 119 transmit, to the client terminal 200 via the communication module 113, approval situation indication data for the indication of the approval situation in the approval workflow (Step S108). Thereby, it is possible for the side of the client terminal 200 to confirm the approval situation in the approval workflow.

On the other hand, the system control part 119, when the fingerprint verification part 116 fails to confirm, in Step 105, a coincidence result in the fingerprint information related matching (Step S105: No) or when the electronic data creation part 117 fails to confirm, in Step 106, a coincidence result in matching related to the document specification information and impression information (Step S106: No), notifies, to the client terminal 200 via the communication module 113, that the approval process in the approval workflow is made invalid (Step S109). In such a case, indication data is transmitted that causes the client terminal 200 to indicate the invalidation of the approval process. Thereby, it is possible for the side of the client terminal 200 to confirm the invalidation of the approval process in the approval workflow.

In this way, in the first exemplary embodiment, the document management server 100 that manages the document data is connected to the client terminal 200 via the in-house LAN 300 (communication line). In addition, the seal 400, which affixes a seal to the paper 500 on which the document specification is provided, establishes a wireless communication to the client terminal 200. The seal 400 reads the document specification information and the user fingerprint and then transmits, to the client terminal 200, the resulting document specification information and user fingerprint together with the impression information. The document management server 100 receives, from the client terminal 200, the document specification information, the user fingerprint, and the impression information. After the coincidence confirmation between the resulting fingerprint and the matching fingerprint and the coincidence confirmation between the resulting set of the document specification information and the impression information and the set of the matching document specification information and the matching impression information, the document management server 100 notifies the approval situation to the client terminal 200.

Thus, when affixing the seal 400 is made to the paper 500 on which the document specification is provided, the document management server 100 notifies the approval situation to the client terminal 200. Thereby, it is possible to linkage the seal 400 to the approval workflow that, for example, identifies the sealed document.

It is to be noted that the first exemplary embodiment employs the configuration in which at the side of the document management server 100, the fingerprint information that is read by the seal 400 is confirmed to be in coincidence with the matching fingerprint information. However, alternatively, it is possible to employ a configuration in which at the side of the seal 400, the fingerprint information that is read by the seal 400 is confirmed to be in coincidence with the matching fingerprint information. In this case, the matching fingerprint information has to be registered in the memory 413 of the seal 400.

Second Exemplary Embodiment

Figure 6:
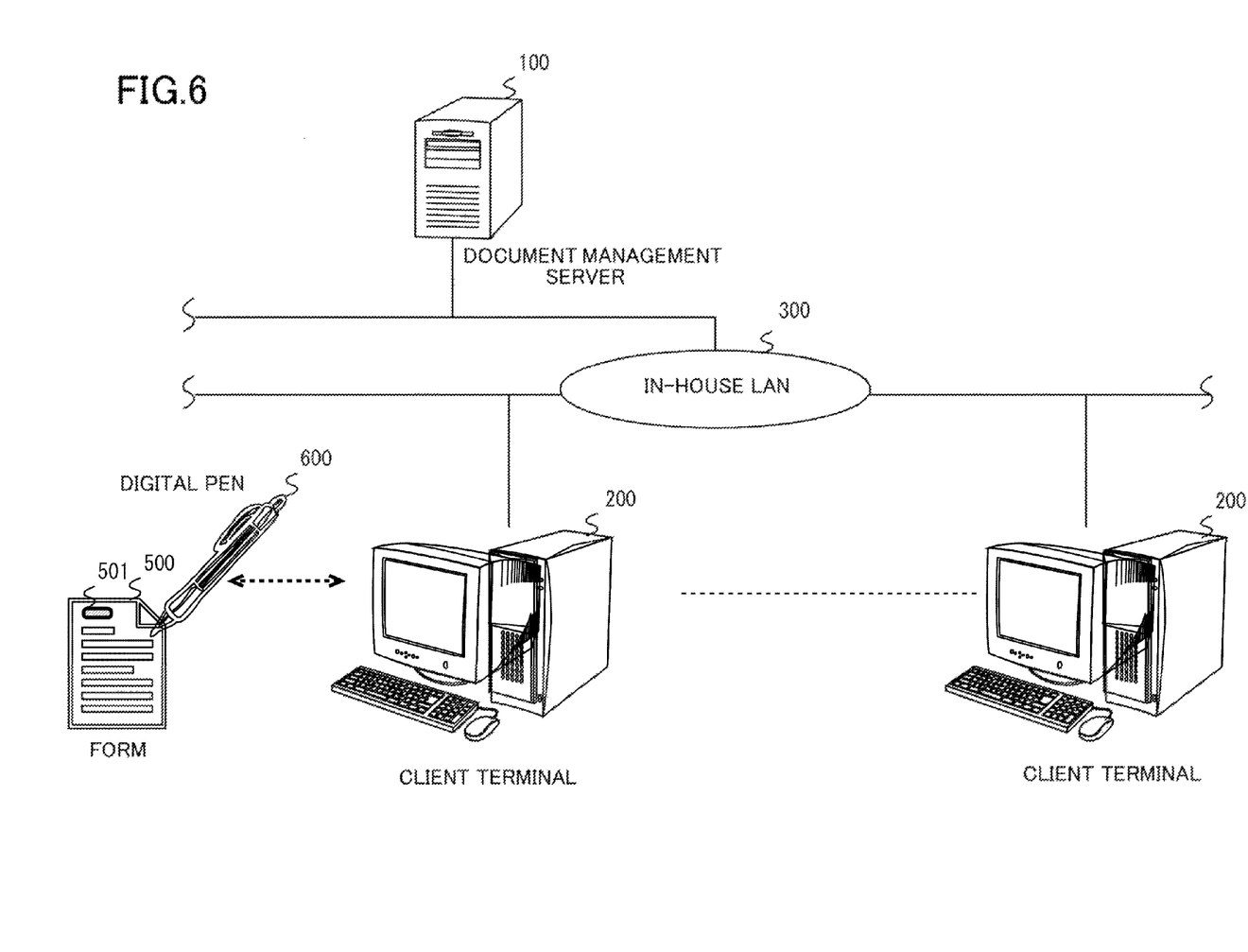
FIG. 6 illustrates an example of an approval system according to a second exemplary embodiment of the present disclosure.
Figure 7:
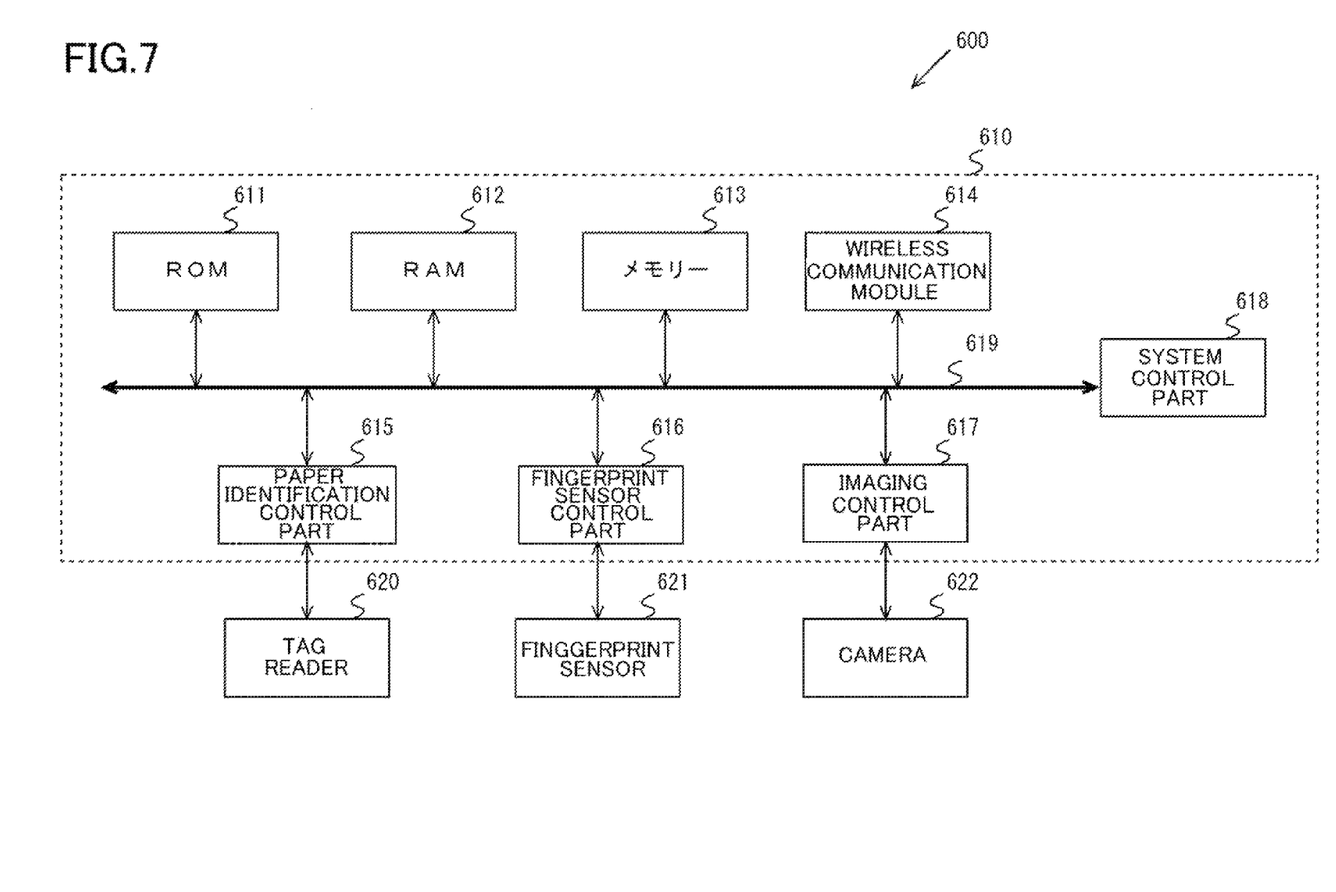
FIG. 7 illustrates a configuration of a digital pen that is shown in FIG. 6.
Figure 8:
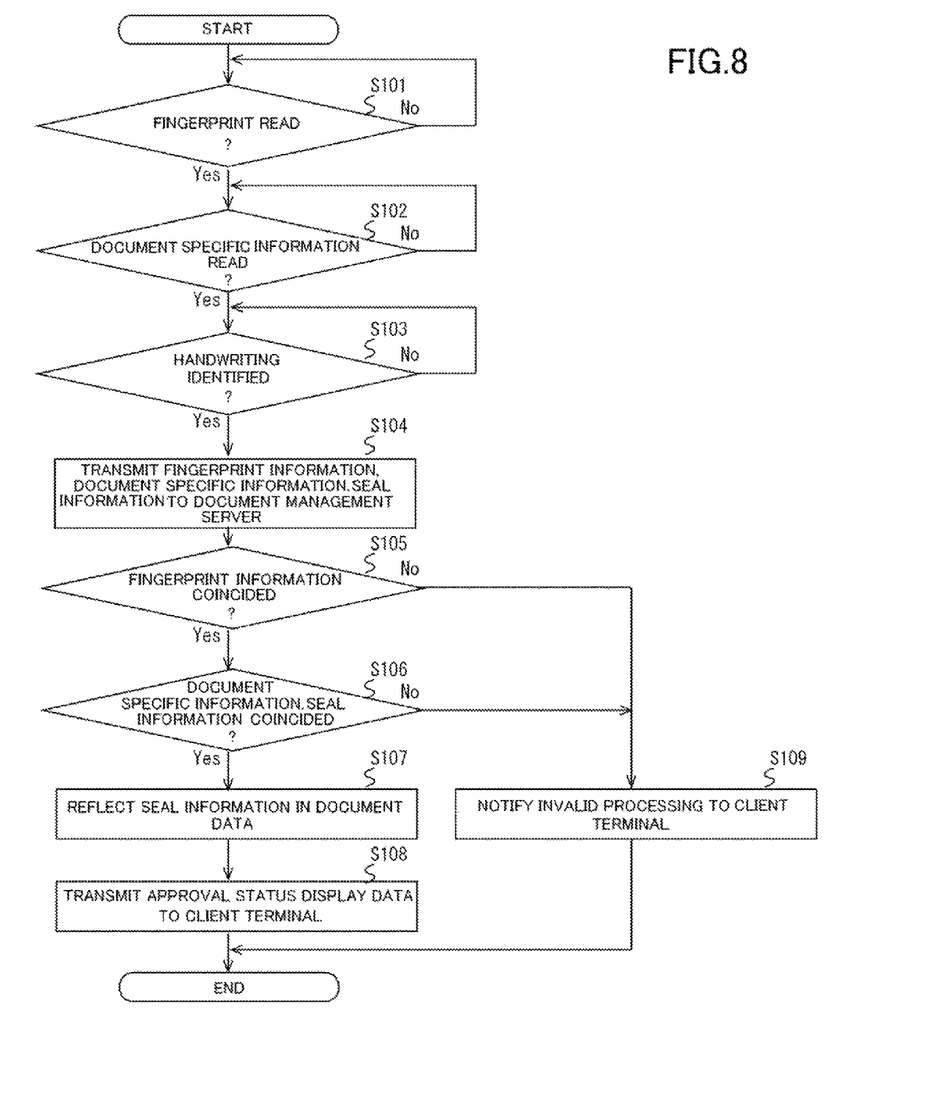
FIG. 8 illustrates approval process steps of the approval system that is shown in FIG. 6.

With reference to FIGS. 6 to 8, a description is made as to a second exemplary embodiment of the present disclosure. More specifically, the second exemplary embodiment in which a digital pen 600 replaces with the seal 400 shown in FIG. 4 is different from the first exemplary embodiment in configuration. It is to be noted that the document management server 100 and the client terminal 200 shown in FIG. 1 are almost identical with those shown in both FIG. 2 and FIG. 3 in configuration. Thus, the different contents will be described in a proper manner.

It is to be noted that in the first exemplary embodiment the fingerprint information, the document specification information, and the impression information are registered in the memory 114 of the document management server 100. However, in the second embroidery embodiment, the fingerprint information, the document specification information, and handwriting information are registered in the memory 114. More specifically, instead of the impression information in the first exemplary embodiment, in the second exemplary embodiment, the handwriting of signature wrote by each of the approvers is registered.

First of all, a digital pen 600 affixes a signature to the paper 500 such as the form to which an RF tag 501 is attached. In addition, the digital pen 600 is constructed as shown in FIG. 7.

That is to say, the digital pen 600 includes a control part 610, a tag reader 620, a fingerprint sensor 621, and a camera 622.

The control part 610 is provided with a ROM 611, a RAM 612, a memory 613, a wireless communication module 614, a paper identification control part 615, a fingerprint sensor control part 616, an image capture control part 617, and a system control part 618. In addition, these devices are connected to each other via a data bus 619.

The ROM 611, similar to that in the first exemplary embodiment, stores, for example, a control program for checking an operation of each part. The RAM 612, similar to that in the first exemplary embodiment, is a work memory that allows for executing a program therein. The memory 613 stores images that are captured by the camera 622 as will be described later. The wireless communication module 614, similar to that in the first exemplary embodiment, communicates in a wireless manner to the client terminal 200.

The paper identification control part 615, similar to that in the first exemplary embodiment, controls a reading operation of the tag reader 620. Thereby, it is possible to read document specification data, via the tag reader 620, from an RF tag 501 attached to the paper 500 such as the form.

The fingerprint sensor control part 616 controls the fingerprint sensor 621 that reads a fingerprint. The image capture control part 617 controls the camera 622 for identifying the handwritten on the paper 500.

The system control part 618 mainly controls a timing of control that is performed by each of the paper identification control part 615, the fingerprint sensor control part 616, and the image capture control part 617.

Next, with reference to FIG. 8, a description is made as to a process flow of the approval system that the second exemplary embodiment provides. First of all, in a case where affixing a signature with the digital pen 600 to the paper 500 such as the form as illustrated in FIG. 6, the system control part 618 of the digital pen 600 is in a waiting condition that lasts until the fingerprint sensor 621 reads a fingerprint of a person who grips the digital pen 600 (Step S101: No). The system control part 618, when reading the fingerprint is conducted by the fingerprint sensor 621 (Step S101: Yes), comes to be in a waiting condition that lasts until the paper identification control part 615 reads, via the tag reader 620, the document specification information (Step S102: No).

The system control part 618, when the paper identification control part 615 reads, via the tag reader 620, the document specification information (Step S102: Yes), comes to be in a waiting condition that lasts until the image capture control part 617 identifies the handwriting that is captured by the camera 622, the handwriting being affixed, with the digital pen 600, to the paper 500 such as the form (Step S103: No).

The system control part 618, causes the image capture control part 617 to identify the handwriting that is captured by the camera 622, the handwriting being affixed, with the digital pen 600, to the paper 500 such as the form (Step S103: Yes). Then, the system control part 618 transmits, via the wireless communication module 614 to the client terminal 200, the fingerprint image that is read by the fingerprint sensor 621, the document specification information that is read by the paper identification control part 615, and handwriting information that is indicative of the handwriting that is identified by the image capture control part 617. At this time, the system control part 218 of the client terminal 200, when the wireless communication module 214 receives the fingerprint image, the document specification information, and the handwriting information from the digital pen 600, stores the preceding fingerprint image, document specification information and handwriting information in the memory 215.

Next, the system control part 218 of the client terminal 200 begins to control the communication module 213. The system control part 218 transmits, to the document management server 100, the fingerprint image, the document specification information, and the handwriting information that are stored in the memory 215 by the system control part 218 (Step S104).

At the side of the document management server 100, the communication module 113 receives the document management server 100, the fingerprint image, the document specification information, and the handwriting information that come from the client terminal 200. Then, the system control part 119 stores temporally the preceding fingerprint image, document specification information and handwriting information in the memory 114.

Then, the system control part 119 comes to be in a waiting condition that lasts until the fingerprint verification part 116 performs a matching between the fingerprint information that is received from the client terminal 200 and the fingerprint information that is registered in the memory 114 (Step S105: No). The system control part 119 confirms that the matching provides a coincidence result between the fingerprint information that is received from the client terminal 200 and the fingerprint information that is registered in the memory 114 (Step S105: Yes). Thereafter, the system control part 119 comes to be in a waiting condition that lasts until the electronic data creation part 117 a matching between a set of the document specification information and the handwriting information both of which are received from the client terminal 200 and a set of the document specification information and the handwriting information both of which are registered in the memory 114 (Step S106: No). At this stage, for the preceding matching, the system control part 119 uses the handwriting information of the user whose handwriting is found to be coincided in Step S105.

The system control part 119, when the electronic data creation part 117 confirms coincidence that the set of the document specification information and the handwriting information both of which are received from the client terminal 200 and the set of the document specification information and the handwriting information both of which are registered in the memory 114 (Step S106: Yes), causes the electronic data creation part 117 to reflect the handwriting information that is stored in the memory 114 on document data that is associated with the document specification information that is stored in the document database 130 (Step S107).

It is to be noted that when the matching that is performed by the electronic data creation part 117 indicates an unmatched result in either the document specification information related matching or the handwriting information related matching, the system control part 119 may make the approval process in the approval workflow invalid and stops the reflection of the impression information on the document data.

In addition, she system control part 119 transmit, similar to that in the first exemplary embodiment, to the client terminal 200 via the communication module 113, approval situation indication data (Step S108). The approval situation indication data is for the display of the approval situation in the approval workflow. Thereby, it is possible for the side of the client terminal 200 to confirm the approval situation in the approval workflow.

On the other hand, the system control part 119, when the fingerprint verification part 116 fails to confirm, in Step 105, a coincidence result in the fingerprint information related matching (Step S105: No) or when the electronic data creation part 117 fails to confirm, in Step 106, a coincidence result in matching related to the document specification information and impression information (Step S106: No), conducts an operation similar to that in the first exemplary embodiment. More specifically, the system control part 119 notifies, to the client terminal 200 via the communication module 113, that the approval process in the approval workflow is made invalid (Step S109). In such a case, display data is transmitted that causes the client terminal 200 to display the invalidation of the approval process. Thereby, it is possible for the side of the client terminal 200 to confirm the invalidation of the approval process in the approval workflow.

In this way, in the second exemplary embodiment, the digital pen 600 that affixes a signature to the paper 500 on which the document specification information is provided communicates in a wireless manner to the client terminal 200. The digital pen 600 reads the document specification information, the fingerprint and the signature handwriting of the user. The digital pen 600, then, transmits, to the client terminal 200, the resulting document specification information, fingerprint, and signature handwriting. The document management server 100 receives, from the client terminal 200, the document specification information, the user fingerprint, and the handwriting information. Then, the coincidence confirmation is made between the resulting fingerprint and the matching fingerprint and the coincidence confirmation is made between the resulting set of the document specification information and the handwriting information and the set of the matching document specification information and the matching handwriting information. Then, the document management server 100 notifies the approval situation to the client terminal 200.

Thus, when affixing the signature with the digital pen 600 is made to the paper 500 on which the document specification is provided, the document management server 100 notifies the approval situation to the client terminal 200. Thereby, it is possible to linkage the seal 400 to the approval workflow that, for example, identifies the signature document.

In summary, indeed the aforementioned commonly used seal with the authentication function is capable of conducting a user authentication by itself, however, fails to linkage the seal 400 to the approval workflow that, for example, identifies the signature document.

To the contrary, according to both an approval system and an approval method of the present disclosure, when a seal is affixed to a paper on which document specification information is provided, a document management server will transmits an approval situation to a client terminal. Thus, it is possible for the seal to linkage to an approval workflow that identifies the document to which the seal is affixed.

In addition, according to both the approval system and the approval method of the present disclosure, when a signature is affixed with a digital pen to the paper on which the document specification information is provided, the document management server will transmits an approval situation to the client terminal. Thus, it is possible for the signature to linkage to an approval workflow that identifies the document to which the signature is affixed.

It is to be noted that in the second exemplary embodiment, at the side of the document management server 100, a handwriting that is captured by the camera 622 of the digital pen 600 is to be confirmed. Thus, plural persons are allowed to use their digital pens 600.

It is to be noted that in the second exemplary embodiment, at the side of the document management server 100, the fingerprint information that is read by the camera 622 of the digital pen 600 achieves the confirmation of the coincidence with the matching fingerprint information. However, instead, the confirmation of the coincidence may be achieved between the read fingerprint information and the matching fingerprint information. In such a case, the matching fingerprint information should be registered in the memory 613 of the digital pen 600.

What is claimed is:

1. An approval system, comprising:
a document management server that operates to manage document data;
a client terminal that is connected to the document management server via a communication line; and
a seal that operates to establish a communication in a wireless manner with the client terminal and that has impression information representing an impression of the seal to be stamped on a paper on which document specification information is provided,
the seal operating to read the document specification information and fingerprint information of a user and transmit the resulting document specification information and fingerprint information and the impression information to the client terminal,
the document management server operates to receive the document specification information, the fingerprint information and the impression information, confirm a coincidence between the received fingerprint and matching fingerprint, confirm a coincidence between a set of the received document specification information and the received impression information and a set of matching document specification information and matching received impression information, and notify an approval situation to the client terminal.

2. The approval system according to claim 1,
wherein the seal includes
a wireless communication module that operates to communicate in a wireless manner with the client terminal,
a memory that has a region in which impression information is stored,
a fingerprint sensor that operates to read a fingerprint,
a reader that operates to read document specification information on a paper,
a distance sensor that operates to detect a distance from the paper, and
a system control part that conducts an operation of causing, when the distance that is detected by the distance sensor comes to be zero, the control wireless communication module to thereby transmit fingerprint information derived from the fingerprint that is read by the fingerprint sensor, the document specification information that is read by the reader, and the impression information that is stored in the memory to the client terminal,
wherein the client terminal includes
a wireless communication module that operates to communicate in a wireless manner with the seal,
a communication module that operates to communicate with the document management server, and
an display part that conducts an operation of displaying approval situation display data that is received from the document management server via the communication module, and
wherein the document management server includes
a document data base that has a region in which is stored document data that is associated to the document specification, a communication module that operates to communicate with the client terminal,
a memory that has regions in which matching fingerprint information, matching document specification information, and matching impression information are stored for registrations thereof,
a fingerprint verification part that conducts an operation of, by matching, confirming whether or not the fingerprint information received via the communication module is in coincidence with the matching fingerprint information registered in the memory,
an electronic data creation part that conducts operations of matching, when the fingerprint verification part confirms that the fingerprint information is in coincidence with the matching fingerprint information, between a set of the document specification information and the impression information received via the communication module and a set of the matching document specification information and the matching impression information both of which are registered in the memory, and reflecting the matching impression information registered in the memory on the document data stored in the document database when the matching provides a coincidence result, and
a system control part that conducts an operation of transmitting, via the communication module, approval situation display data for displaying the approval for displaying the approval situation.

3. An approval system, comprising:

a document management server that operates to conduct an operation of managing document data;

a client terminal that is connected to the document management server via a communication line; and a digital pen that operates to establish a communication in a wireless manner with the client terminal and that operates to affix a signature to a paper on which document specification information is provided, the digital pen operating to read the document specification information, fingerprint information of a user and a handwriting of the user, and transmit, to the client terminal, the resulting document specification information, the resulting fingerprint information and handwriting information that is indicative of the resulting handwriting, the document management server operating to receive the document specification information, the fingerprint information and the handwriting information from the client terminal, confirming a coincidence between the received fingerprint information and matching fingerprint information, confirm a set the received document specification information and the received handwriting information and a set of matching received document specification information and matching received handwriting information, and notify an approval situation to the client terminal.

4. The approval system according to claim 3, wherein the digital pen includes a wireless communication module that operates to communicate in a wireless manner with the client terminal, a fingerprint sensor that operates to read a fingerprint, a reader that operates to conduct an operation of reading document specification information on a paper, a camera that operates to capture a handwriting on the paper, and a system control part that conducts an operation of controlling the control wireless communication module to thereby transmit finger print information derived from the fingerprint that is read by the fingerprint sensor, the document specification information that is read by the reader and handwriting information that is captured by the camera, wherein the client terminal includes a wireless communication module that operates to communicate in a wireless manner with the digital pen, a communication module that operates to conduct an operation of communicating with the document management server, and an display part that conducts an operation of displaying approval situation display data received from the document management server via the communication module, and wherein the document management server includes a document database having a region in which document data is stored that is associated to the document specification information, a communication module that operates to communicate with the client server, a memory that has regions in which fingerprint information, document specification information, and handwriting information are stored for registrations thereof, a fingerprint verification part that conducts an operation of, by matching, confirming whether or not the fingerprint information received via the communication module is in coincidence with the fingerprint information registered in the memory, an electronic data creation part that conducts operations of matching, when the fingerprint verification part provides a coincidence result in fingerprint information, between a set of the document specification information received via the communication module and the hand-writing information received via the communication module and a set of the document specification information and the hand-writing information both of which are registered in the memory, and reflecting the hand-writing information registered in the memory on the document data stored in the document database when the matching provides a coincidence result, and a system control part that conducts an operation of transmitting, via the communication module, approval situation display data for displaying the approval for displaying the approval situation.

* * * * *